(12) United States Patent
Kirshenbaum

(10) Patent No.: US 10,101,936 B2
(45) Date of Patent: Oct. 16, 2018

(54) MEMORY ACCESS CONTROL

(71) Applicant: Hewlett Packard Enterprise Development LP, Houston, TX (US)

(72) Inventor: Evan R. Kirshenbaum, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/325,068

(22) PCT Filed: Jul. 28, 2014

(86) PCT No.: PCT/US2014/048501
§ 371 (c)(1),
(2) Date: Jan. 9, 2017

(87) PCT Pub. No.: WO2016/018234
PCT Pub. Date: Feb. 4, 2016

(65) Prior Publication Data
US 2017/0185344 A1   Jun. 29, 2017

(51) Int. Cl.
*G06F 12/00* (2006.01)
*G06F 3/06* (2006.01)
(52) U.S. Cl.
CPC .......... *G06F 3/0637* (2013.01); *G06F 3/0622* (2013.01); *G06F 3/0673* (2013.01)
(58) Field of Classification Search
CPC ..... G06F 3/0637; G06F 3/0622; G06F 3/0673
See application file for complete search history.

(56) References Cited

U.S. PATENT DOCUMENTS

| | | |
|---|---|---|
| 7,191,307 B1 | 3/2007 | Cunei |
| 7,380,276 B2 | 5/2008 | Saha et al. |
| 7,401,358 B1 | 7/2008 | Christie |
| 8,157,654 B2 | 4/2012 | Link |
| 2005/0086517 A1 | 4/2005 | Willman et al. |
| 2008/0028436 A1 | 1/2008 | Hannel |
| 2009/0113110 A1 | 4/2009 | Chen et al. |
| 2009/0287837 A1 | 11/2009 | Felsher |
| 2010/0153671 A1 | 6/2010 | Safa |
| 2010/0205385 A1 | 8/2010 | Spatafore |
| 2010/0293342 A1 | 11/2010 | Morfey et al. |

(Continued)

FOREIGN PATENT DOCUMENTS

| | | |
|---|---|---|
| EP | 2284802 A1 | 2/2011 |
| WO | WO-2012120267 A1 | 9/2012 |

OTHER PUBLICATIONS

"Secure Boot for QorIQ Communications Processors" White Paper, Freescale.com, Jan. 25, 2013, 4 pages.

(Continued)

*Primary Examiner* — Shawn X Gu
(74) *Attorney, Agent, or Firm* — Hewlett Packard Enterprise Patent Department

(57) ABSTRACT

Techniques disclosed herein relate to a method performed on a computing device in response to a request to identify a segment of memory. The method includes determining a desired sensitivity value for the request and determining a desired trust value for the request. The method also includes producing a memory segment identification result based on the desired sensitivity value and based on the desired trust value.

17 Claims, 6 Drawing Sheets

(56) References Cited

U.S. PATENT DOCUMENTS

| | | |
|---|---|---|
| 2011/0072220 A1 | 3/2011 | Marietta et al. |
| 2012/0030406 A1 | 2/2012 | Chang et al. |
| 2013/0227712 A1* | 8/2013 | Salem ................ G06F 21/6218 726/30 |
| 2014/0196104 A1 | 7/2014 | Suresh et al. |
| 2015/0278126 A1 | 10/2015 | Maniatis |
| 2015/0319099 A1 | 11/2015 | Yamato |

OTHER PUBLICATIONS

Cavallaro, L., et al., "On the Limits of Information Flow Techniques for Malware Analysis and Containment", Feb. 11, 2008, 22 pages.
International Search Report and Written Opinion, Application No. PCT/US2014/048500 dated Feb. 27, 2015, 11 pages.
International Search Report and Written Opinion, PCT/US2014/048501, Filed Jul. 28, 2014, 11 pages.
Srivastava, A., "Robust and Secure Monitoring and Attribution of Malicious Behaviors", Georgia Institute of Technology, Aug. 2011, 165 pages.
Strackx, R., et al., "Efficient Isolation of Trusted Subsystems in Embedded Systems", IBBT-Distrinet, Katholieke Universiteit Leuven, Heverlee, Belgium, Jun. 21, 2010, 18 pages.

* cited by examiner

400

600

MEMORY ACCESS CONTROL

BACKGROUND

For computer devices, access control is the selective restriction of access to a particular page in memory, to a code or instruction, or to other data or computer resources. Data stored in computer storage, or in a storage library, or in some other type of storage medium, such as a database, can include confidential information, such as encryption keys, for example. It is desirable for an entity to safeguard confidential information from being accessed by other entities or processes, which may be malicious. By implementing access control in a computer device, confidential or sensitive information can be safeguarded from certain programs or processes that should be restricted from accessing the particular data.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
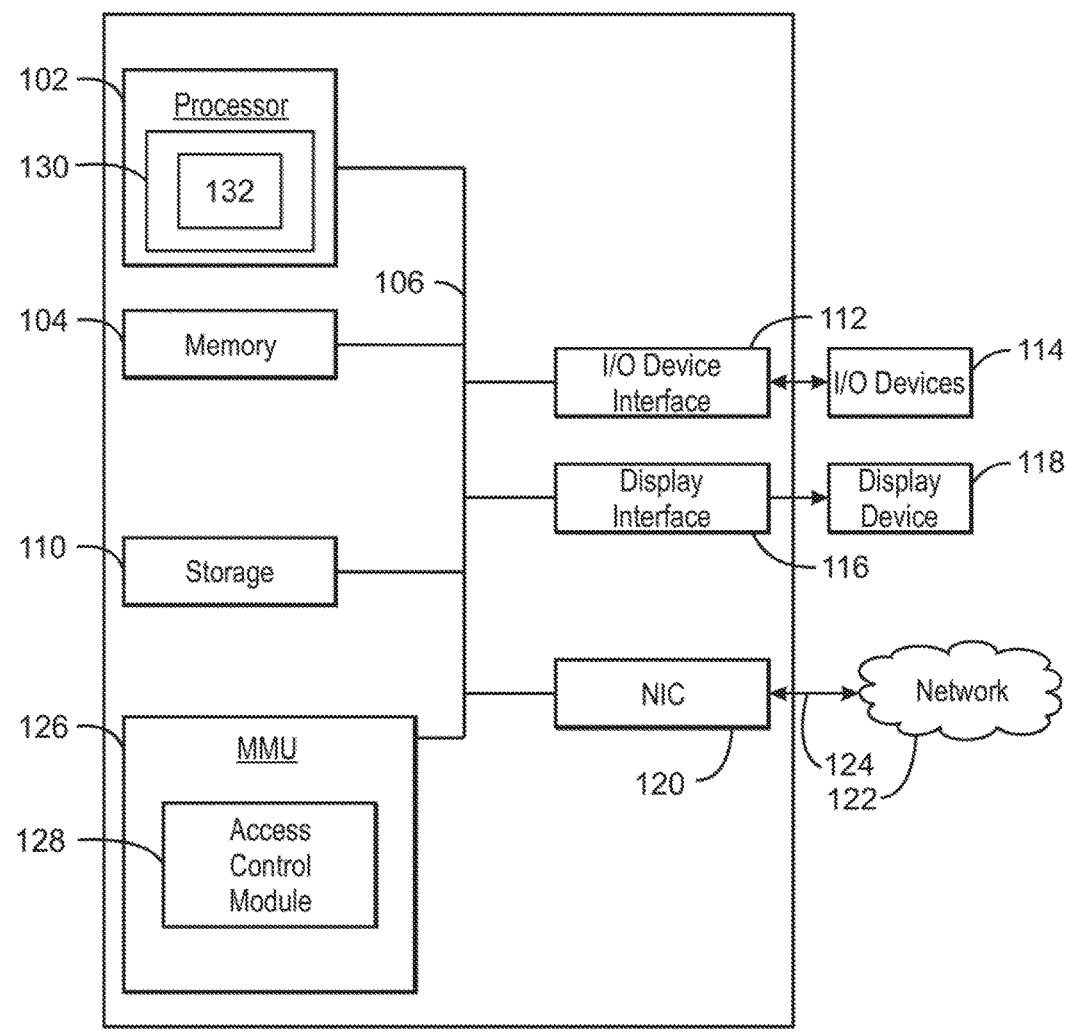
FIG. 1 is a block diagram of an example computer device for secure address translation.

In most computers, access control is typically enforced by an operating system (OS) at the process level. Long-term data is typically stored as files on disk or other non-volatile storage such as magnetic tape, solid-state drive (SSD), read-only memory (ROM), flash memory, or memristor-base memory, and when a process requires access to that data, these files are read into memory and the operating system checks that the credentials held by the process are sufficient to access the files. Process boundaries are typically used to guard against illegal access to sensitive data. When the data is sensitive, a process can read the data only if the process provides trusted credentials, such as running as "root" or "administrator," or another system user who has been granted access to the necessary files. Obtaining or enabling such trusted credentials may require demonstration of knowledge of privileged information, such as a password or personal identification number (PIN). Obtaining trusted credentials can include connecting an identifying device to the system, or verifying of identity by another system or delegation rule using another demonstrated identity.

In some cases, sensitive data may include data that should be viewable, by processes possessing certain credentials, as well as data that should not be viewable by processes possessing only those credentials. For example, the sensitive data may include the account balances for all accounts at a bank, where a process's credentials may only grant it the right to view information about the balance of a specific account or set of accounts. Additionally, sensitive data may have associated rules regarding its modification. In the example, an account-specific credential may grant a process the right to decrease the account balance for that account while increasing the account balance of another, but it does not give the process the right to manipulate the account balance in arbitrary ways, for example, by simply asserting that the balance is higher.

When an untrusted process, for example, a process whose credentials do not afford it unfettered access to the entirety of the data, requires access to sensitive data, it uses an inter-process communication mechanism, Such as a remote procedure call, message queue, or socket, to communicate with a trusted process, for example, a process whose credentials afford it complete or near-complete access to the data. Granting access usually necessitates use of a context switch, in which the operating system pauses running the instructions of the requesting process and begins or resumes running the instructions or the process that is the target of the communication, after restoring the memory mapping information and credentials that make up the process's execution context. Granting access can necessitate the untrusted process constructing a request object or other similar means to communicate the operation that is desired, along with any parameters, including a verifiable means by which the trusted process can determine the credentials or identity that should be used to determine whether the requested operation may be performed. Granting access can also necessitate the trusted process interpreting the request object to determine the requested operation, verifying the credentials, checking that the credentials are sufficient for the requested operation, and performing the requested operation. The trusted process may construct a result object or similar means to communicate the result. The OS may perform another context switch to allow the requesting process to run again, and the requesting process must interpret the result object. Use of a context switch to perform switching between process boundaries, and to allow untrusted code to obtain access to sensitive data, is both costly and time consuming.

To allow operating system calls to perform tasks that user code should not be allowed to, systems incorporate a hardware-mediated privilege level, where threads running in kernel mode, or an equivalent operating-system-specific privileged mode, have more privilege than those running in user mode. Systems often have multiple processing levels, and to switch from one to another the user makes a system call, which is a trap to an OS-provided routine that runs in kernel mode. This entry, and subsequent exit, can have a substantial overhead, though typically far smaller than the OS functions they bound, which often involve interaction with slow devices such as disks and networks. Thus, a system may enforce access control by requiring code accessing sensitive data to be running with a special OS privilege level such as kernel mode.

The techniques discussed herein generally relate to distinguishing, via a memory management unit (MMU), between trusted and untrusted code pages within a user process, allowing only instructions residing on trusted code pages to access sensitive data. A processor will include a number of registers, some of which are used for keeping intermediate values, some of which are used as "housekeeping registers, others specifying pointers to data, others resulting from operations being combined together, and at least one register contains, or is otherwise related to, the address of an instruction that is being performed. Memory may be organized in pages, or contiguous blocks of memory aligned along some numeric boundary. Each individual piece of memory, for example, a byte or word, has a numeric physical address that identifies it, and the memory that constitutes a single page share a page address derivable from the physical addresses of any of the contents, typically as the high-order bits. Some pages in memory can be declared to be sensitive for containing sensitive data, and in some examples a sensitivity designation is encoded in the page address. Access to sensitive pages can be controlled by identifying whether an instruction requesting access to that page originates from a trusted page, for example, a page that should be allowed the requested access to the sensitive page.

Access to secure data can be controlled without remote procedure calls, message passing, sockets, or other forms of inter-process communication. Therefore, access to secure data can be obtained without a context switch. Untrusted code that requires access to sensitive data can use a simple local function call to call trusted code linked in to the untrusted process as a library or via a similar mechanism, which, running in the same process, checks that the untrusted process's credentials allow the requested access and performs the requested operation, returning results as a local function return. When the trusted code requires access to the sensitive data, the access is mediated by the MMU, which can perform the check efficiently in hardware or firmware. In some examples, the access check performed by the MMU uses the register containing the address of the memory containing the instruction being executed.

FIG. 1 is a block diagram of an example computer device 100 for secure address translation. The computer device 100 may be, for example, a smartphone, a computing tablet, a laptop computer, or a desktop computer, among others. Sensitive data include, for example, data or information that is confidential, data that is encrypted and encryption keys, data that is essential to an OS or protected at the OS level, and the like. As used herein, a sensitive unit of memory is a unit of memory that stores data to which access is restricted. One example of a unit of memory is a memory page. Although some examples described herein refer to pages in memory, it will be appreciated by those skilled in the art that the disclosed techniques can be used with any suitable memory unit.

The computer device 100 may include one or more processors 102 configured to execute stored instructions, as well as a memory device 104 that stores instructions that are executable by the processor 102. A processor 102 can be a single core central processing unit (CPU), a dual-core CPU, a multi-core CPU, a computing cluster, or the like. A processor 102 may also be a special-purpose processor (or "coprocessor" or "accelerator") such as a graphics processing unit (GPU), a floating-point coprocessor, an encryption coprocessor, or a field-programmable gate array (FPGA). The processor 102 may be coupled to the memory device 104 by a bus 106 where the bus 106 may be a communication system that transfers data between various components of the computer device 100. In examples, the bus 106 may be a PCI, ISA, PCI-Express, HyperTransport®, NuBus, or the like.

The memory device 104 can include random access memory (RAM), e.g., SRAM, DRAM, Zero capacitor RAM, eDRAM, EDO RAM, DDR RAM, RRAM, PRAM, read only memory (ROM), e.g., Mask ROM, PROM, EPROM, EEPROM, flash memory, or any other suitable memory systems, including resistive memory. Resistive memory can include, but is not limited to, memristor, ReRAM, MRAM, and phase change memory, for example. Memory may be volatile or non-volatile. Contents of volatile memory are lost when power to the memory is removed, while contents of non-volatile memory are retained when power to the memory is removed. The computer device 100 may also include a storage device 110. The storage device 110 may include physical memory Such as a hard drive, an optical drive, a flash drive, an array of drives, or any combinations thereof.

The processor 102 may be connected through the bus 106 to an input/output (I/O) device interface 112 configured to connect the computer device 100 to one or more I/O devices 114. The I/O devices 114 may include, for example, a keyboard, a mouse, a pointing device, wherein the pointing device may include a touchpad or a touchscreen, among others. The I/O devices 114 may be built-in components of the computer device 100, or located externally to the computer device 100.

The processor 102 may also be linked through the bus 106 to a display interface 116 configured to connect the computer device 100 to display device 118. A display device 118 may be a built-in component of the computer device 100, or connected externally to the computer device 100. The display device 118 may also include a display screen of a smartphone, a computing tablet, a computer monitor, a television, or a projector, among others. In some examples, the display screen may include a touch screen component, e.g., a touch-sensitive display. The touch screen component may allow a user to interact directly with the display screen of the display device 118 by touching the display screen with a pointing device, one or more fingers, or a combination of both.

A network interface controller (NIC) 120 may also be linked to the processor 102. The NIC 120 may link the computer device 100 to a network 122 through a physical connection, such as a cable 124, which may be an optical cable, for example, a photonic cable. A wireless local area network (WLAN) is not shown, but can establish a wireless connection between the computer device 100 and the network 122. Either a network connection cable 124 or a wireless connection allows the computer device 100 to network with resources, such as the Internet, printers, fax machines, email, instant messaging applications, and with files located on storage servers.

The computer device 100 may include a number of modules configured to provide the memory access control described herein. For example, the computer device 100 can include a memory management unit (MMU) 126. An instruction executing on processor 102 may indicate a requirement to access the contents of memory 104. For example, the instruction may instruct processor 102 to compute a value based on the contents of a location in memory 104 ("read"), it may instruct processor 102 to store a value in a location in memory 104 ("write"), or it may instruct processor 102 to begin executing instructions stored at a particular location in memory 104 ("execute", "branch", or "jump"). To perform these memory operations, processor 102 may make a memory access request on the MMU 126. The MMU 126 can be used to translate virtual memory addresses used by software running on processor 102 into physical memory addresses that can be interpreted by the memory device 104. Although shown as a separate component, the MMU 126 can also be implemented within the processor 102. The MMU 126 described herein is configured to determine the allowability of the memory access request (that is, whether the memory access request should be allowed) based on a target address and a source address associated with the request. As used herein the term "target address" refers to a memory address to which an instruction is trying to gain access, and the "source address" refers to the memory address from which the instruction originated. The target address may be a target virtual address or a target physical address and the source address may be a source virtual address or a source virtual address.

The MMU 126 includes an access control module 128 configured to control access to sensitive memory pages. The access control module 128 may be a physical component of the MMU 126 or it may merely be descriptive of functionality provided by the MMU 126. If the access control module 128 determines that an instruction should be allowed to access a page of memory, the MMU 126 can translate the virtual memory address into the corresponding physical memory address and provide the physical memory address to the memory device 104. If the access control module 128 determines that an instruction should not be allowed to access a page of memory, the MMU 126 can trigger a page fault or otherwise indicate to the processor 102 that the access should not be allowed.

In some examples, address bits from both the instruction address contained in a register 130 of the processor 102 called a program counter register 132 (or simply program counter), and the referenced address can be used in an example to rewrite the referenced address before it is mapped to a physical address. When access rights have been established by the access control module 128, and the allowability of the memory access request has been determined, an address translation is performed by the MMU 126. The MMU 126 is configured to translate a virtual address into a physical address in memory, and utilizes access control techniques described herein. In some examples, as long as a correct target address is found, then the MMU 126 can map the target address to a physical address. A target location in the memory can be specified by a target address associated with the instruction. An allowability of an access to the target location can be based on the source address and the target address. These techniques permit the desired address translation and access control, depending on the status of data and pages that may be sensitive, and code and instructions that may not be trusted. Access to sensitive memory pages can thus be controlled through analyzing the address of the instruction making the access request, for example, the address of the memory location containing the instruction, as indicated by the contents of the program counter register 132, rather than monitoring the privilege level of a running thread.

The block diagram of FIG. 1 is not intended to indicate that the computer device 100 is to include all of the components shown in FIG. 1. Further, any number of additional components may be included within the computer device 100, depending on the details of the specific implementation of the access control techniques described herein.

Figure 2:
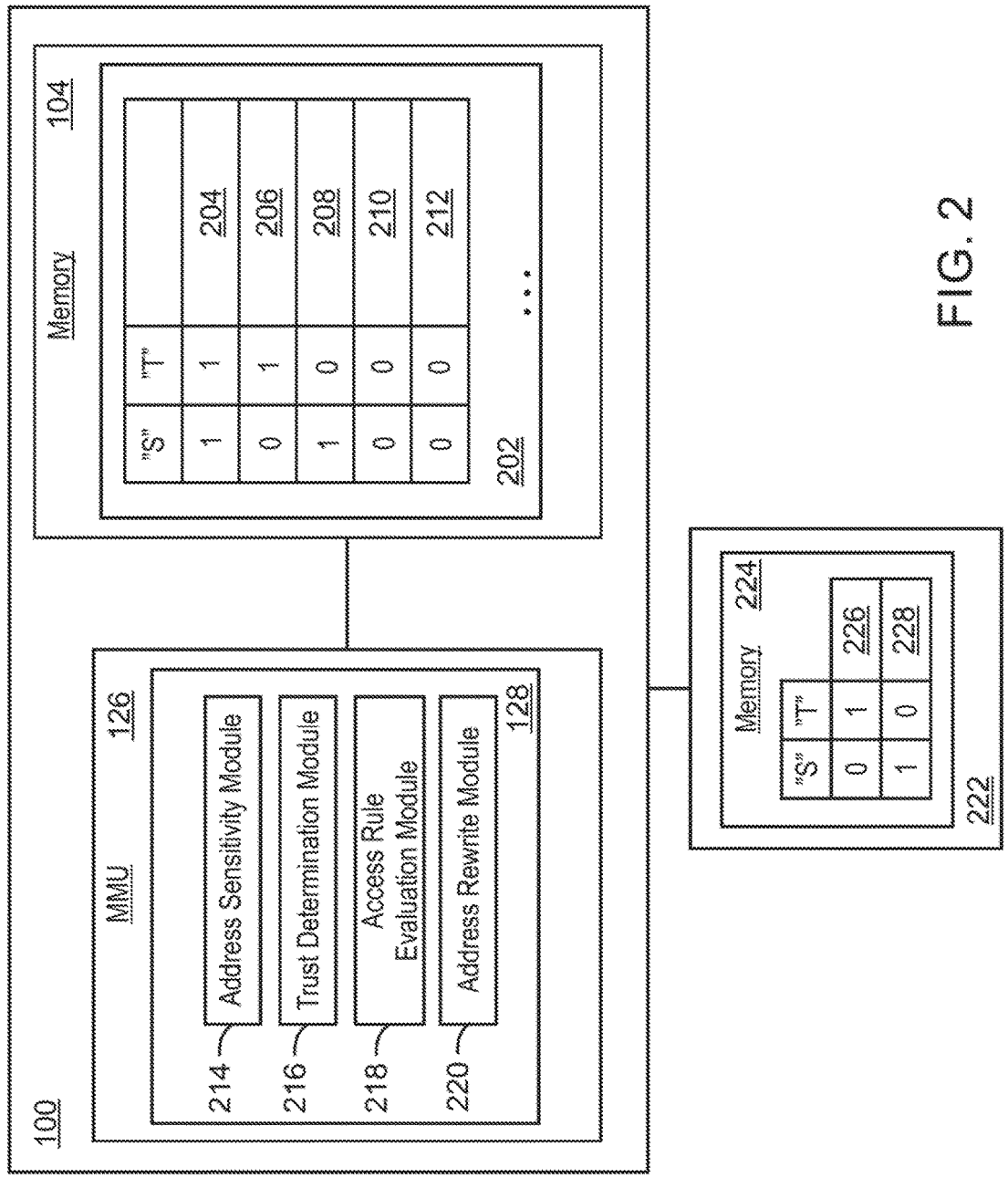
FIG. 2 is a block diagram of an example of system for performing secure address translation.

FIG. 2 is a block diagram of an example of a system for performing secure address translation. Like numbered items are described in the same manner as done previously herein. A computer device 100 is shown that includes memory 104. The memory 104 includes a memory module 202. In some examples, there can be additional memory modules. The memory 104 and the memory module 202 are communicatively coupled to the MMU 126.

Each unit or page of memory may be identified as sensitive or not sensitive. In an example, this is indicated by the value of a certain indicator bit or bits in the page's address. In an example, when code or data is loaded into the memory, the system will ensure that it will be loaded onto a page whose address reflects the sensitivity (or lack of sensitivity) of the code or data. In FIG. 2, for example, pages 204, 206, 208, 210, and 212 stored in the memory module 202 each have addresses that include a sensitivity indicator bit, which can have a value of 0 or 1, for example, which can be identified with the Boolean, or logical values "false" and "true". A bit can represent a Boolean or logical value. For example, page 204 has a sensitivity indicator bit indicating that S=1, which corresponds to page 204 being designated as sensitive. Other pages in the memory module 202 have sensitivity bits having S=0, such as pages 206, 210, and 212, indicating the page is not a sensitive page.

There may be several reasons for maintaining a page in memory as sensitive, including maintaining the integrity of the computer system by restricting access to the code and data structures that are needed for the operation of the operating system itself, protection against computer viruses or other malicious attacks, and protection of private data such as user passwords and account numbers, among others. In some examples, each unit of memory can be assigned a sensitivity classification that can be used to prevent non-system code from violating system policies. A violation could occur, for example, if non-system code were allowed to observe certain information about other processes or about the internal state of the operating system and made requests based on this knowledge. A violation can occur, for example, if the non-system code were allowed to modify system code that makes scheduling or resource limitation decisions, substituting code that treated the non-system process more favorably than it would have. A violation can also occur, for example, if the non-system code were allowed to modify the data structures that recorded the results of those decisions, convincing the operating system that it had decided to treat the non-system process more favorably than it had.

Sensitivity classifications can be used to prevent non-system code from avoiding being charged for resources consumed, for example, disk space, processor time, or network bandwidth when billed by usage. For example, without the sensitivity classifications, non-system code could avoid being charged for resources consumed if it were allowed to modify the record of resources the non-system code had used, alter the schedule of charges applicable to the non-system code, impersonate a different billable entity, or replace code responsible for recording usage with code that did not faithfully record the non-system code's usage. Sensitivity classifications can also be used to prevent a process engaging in negotiation with another process from gaining an unfair advantage. An unfair advantage might include an outside process being able to observe the private state of another process or the code the other process will use to make its offers or acceptances. Sensitivity classifications can be useful on a system on which programs may run on behalf of multiple mutually distrusting entities. For example, when two entities that may be business competitors use computing resources that include processes that may reside on the same system, as when both use the same cloud computing provider, for example, it is beneficial to prevent programs of one entity from reading data associated with another entity. Sensitivity classifications can be used to prevent access to sensitive personal information, for example, health records, credit card information, passwords, encryption keys, and the like.

Determining the allowability of a memory access request can be based on a sensitivity value and a trust value. Each unit or page of memory may be identified as trusted or not trusted. In an example, this is indicated by the value of a certain indicator bit or bits in the page's address. In such an example, when code is loaded into the memory, the system will ensure that it will be loaded onto a page whose address reflects the trust, or lack of trust, of the code. For example, at shown in FIG. 2, pages 204, 206, 208, 210, and 212 each have addresses that include, in addition to the sensitivity indicator bit, a trust indicator bit, which can have a value of 0 or 1, for example. Page 204 has a trust bit indicating that T=1, which corresponds to page 204 being designated as trusted. Other pages in the memory module have trust bits having T=0, such as pages 208, 210, and 212 indicating the page is not a trusted page. Although the sensitivity indicator bit is shown as being adjacent to and preceding the trust indicator bit, this need not be the case. Any bits from the address may be used to specify sensitivity or trust, as specified by the system. In addition, different bits may be used for different pages.

The trust and sensitivity of a page are determined when the page is allocated. In an example, when a process makes a request to the operating system to identify and return a reference to a segment of memory (also known as a request to allocate memory), for example via the C++ programming language's "malloc" (memory allocate) function, it may provide information associated with the request in the form of additional parameters that indicate requirements or desires as to the sensitivity and trust values of the pages on which the memory should be allocated. References to the operating system in examples should be construed to refer to any relatively privileged subsystem of the computer system including, without limitation, a basic input/output system (BIOS), virtual machine emulator, hypervisor, or database manager. In an example, when a request is made to allocate memory, the operating system may identify pages with compatible sensitivity and trust values to the requirements specified in the request parameters and with sufficient unallocated memory. In an example, when a request is made to allocate memory, the operating system may allocate a new page in memory and ensure that its address is compatible with the sensitivity and trust requirements specified in the request parameters. In an example, when a request is made to load a resource from a file or other permanent storage, from another process in the computer system, from another location in the memory of the computer system, or from a source external to the computer system into memory, additional parameters can be provided to indicate whether it should be loaded onto sensitive or trusted pages.

A resource may be a file, a program, a library, a routine, a data set, a message, a result of invoking an operation, a data item, a data structure, a document, a string, or any other information that may be required to be placed in the memory of the computer system. In an example, the indication of whether a resource should be loaded onto sensitive or trusted pages may be associated with the resource rather than the request and determined by the operating system. The indication may be associated with the resource by being contained within the contents of the resource or within metadata associated with the resource, by being associated with a name of the resource or with a value computed based on a content of the resource via a table or data structure, or by other means.

In an example, the indication of whether the loaded resource is sensitive or trusted may not be uniform across the entirety of the file, resulting in different parts of the resource being loaded onto pages with different trust or sensitivity levels. To accomplish this, a plurality of trust values and sensitivity values are determined for each of the plurality of parts of the resource and a plurality of sub-segments of memory is identified based on the respective trust values and sensitivity values for the respective parts. The general response to a request to identify a segment of memory may be termed a "memory segment identification result" and may include, without limitation; returning a reference to a memory segment or segments; returning an object containing a reference to a memory segment or segments, or returning a reference to such an object; or indicating a refusal to identify one or more requested memory segments. Returning a value may include returning the value on a program stack, sending a message containing the value, storing the value in a place known to the requester, placing the value in a register, etc. Indicating a refusal to identify may include returning an object known to indicate such a refusal, such as a null pointer or zero value; throwing an exception; calling a function provided for this eventuality; etc.

To ensure that code loaded onto trusted pages is and remains trustworthy, the operating system may require that code loaded onto trusted pages has been verified to be trustworthy. It may do this by checking a constraint, as by evaluating a rule, based on the desired sensitivity value and the desired trust value and indicating a refusal to complete the request, as by returning an error value or throwing an exception, if the desired sensitivity value and the desired trust value violate the rule. Alternatively, rather than indicating a refusal to complete the request, the operating system may alter the desired trust value or the desired sensitivity value to values that satisfy the constraint and may return an indication of this modification. As an example of such a constraint, the operating system may require that when allocated memory is requested to be on trusted pages it is also requested to be on sensitive pages. This ensures that untrusted code cannot place code on pages that are assumed to contain trusted code.

In some examples, evaluating the rule may further take into account the trust value associated with a memory location containing the instruction requesting the allocation. In some examples, the evaluating rule may take into account a credential associated with a computational context associated with the request. Such a credential may include an established principal, identity, or role, a permission, a capability, a ticket a digital certificate, or other information available to the operating system by means of which the operating system can determine whether a party making the request has permission to do so or whether a resource associated with the request is compatible with the request. In an example, the operating system may associate a principal, such as a user name, with each process, the right to run as a particular user being proven to the operating system by means of a password or PIN, the presentation of a physical token, a biometric property of a user, such as a fingerprint, voice print, or retinal scan, or by other means.

The operating system may contain within its data structures, an indication of which users have permission to request the allocation of memory segments which will be considered trusted, and it may check the requesting process's principal identity against these indications in the process of checking its constraints. In another example, the operating system may require that when a resource is loaded from the file system onto trusted pages either the request comes from trusted code or the file being loaded has been previously certified as being eligible to be loaded on trusted pages. This eligibility may be determined by computing a cryptographic hash value of the file and verifying that that there exists a digital certificate, signed by an authority the operating system trusts, for example, the OS vendor, attesting to the trustworthiness of a file with that cryptographic hash. A cryptographic hash value, also known as a message digest, is a value computed, via a cryptographic hash function, based on data such as the contents of a file which is, in most cases, Substantially smaller than the data it is computed on and has the properties that it is computationally intractable to determine the data based on the cryptographic hash value and it is highly improbable that two distinct instances of data with different values will result in the same cryptographic hash value. Examples of cryptographic hash functions include the message digest functions MD-4 and MD-4, the secure hash algorithms (e.g., SHA-1), and the Digital Signature Algorithm (DSA).

In some examples, checking the constraint may involve identifying a first programmatic subsystem associated with the request and confirming that if the request indicates a desire for a sensitivity value or trust value that is restrictive to code trusted by a second subsystem, that second subsystem is either the same as the first or there is a trust relationship established with the operating system between the first subsystem and the second subsystem. A subsystem may be associated with the request by being associated with a memory location containing an instruction involved in making the request, by being associated with the process making the request, or by other means. In an example, when code is loaded onto trusted pages, either those pages are further marked as being sensitive or they are marked as being read-only. The latter ensures that no process can modify the contents, while the former ensures that only trusted code can modify the contents.

The access control module 128 of the MMU 126 can include one or more modules configured to implement access control, including an address sensitivity module 214, trust determination module 216, an access rule evaluation module 218, and an address rewrite module 220. The address sensitivity module 214 analyzes the sensitivity indicator bit associated with a particular target page (or target address to determine whether an address that the processor is attempting to access is sensitive.

The trust determination module 216 is configured to analyze a trust bit associated with the address of the page from which the instruction originates. The trust determination module 216 analyzes a program counter register 132 associated with the processor 102 to determine the status of a trust bit associated with the instruction. The program counter register 132 provides the address of the instruction making the request to read or write on pages in memory 104. When the instruction is in its passive state, when it is not being executed, the instruction will reside on one of the pages in of the memory module 202. As the instruction is being executed, it can be copied into the processor 102. In some examples, the instruction will have moved through at least one and probably several levels of cache. In some examples, both the CPU and the cache(s) will think of the address on the page in the memory as being the "real" location of the instruction, and this location will be the one stored in the program counter register 132 of the CPU. In some systems, the value contained in the program counter register 132 on the register 130 may be incremented as the instruction is read. In some examples, an adjustment may be made either within the MMU 126 or to the instruction address provided to the MMU 126 to compensate for this so that the trust determination is made based on the address of the instruction making the request.

In an example, one instruction originates from the memory module from a page 206 having a trust value of T=1, as indicated in the page address. This page 206 is a trusted page, and when the program counter register 132 indicates that the instruction being executed originates from page 206, the trust determination module 216 will determine that the instruction from page 206 requesting to access other information from the memory module 202 is, in fact, coming from a trusted source.

The access rule evaluation module 218 is configured to apply an access rule and determine whether access to the requested memory should be allowed or denied based on the trust indicator of the instruction address, as determined by the trust determination module 216, and the sensitivity indicator of the requested memory page, as determined by the address sensitivity module 214. The access rule may involve a comparison of the sensitivity indicator and the trust indicator or it may involve other computation based on the sensitivity indicator and the trust indicator and possibly the request type or other information. For example, the evaluation module 218 can be configured to compute $S_{addr}=0 \lor T_{instr}=1$, where $S_{addr}$ is the sensitivity of the memory location being accessed, as determined by the address sensitivity module 214, and $T_{instr}$ is the trust level of the instruction making the request, as determined by the trust determination module 216. This is a Boolean expression that says that access should be granted if and only if either the page requested is not sensitive or the instruction is trusted. The access rule evaluation module 218 will analyze the page 204 that is trying to be accessed and the page 226 from where the instruction originates. The access rule evaluation module 218, in this example, will compute that the page trying to be accessed 204 has a sensitivity bit of S=1, and thus it is sensitive. The access rule evaluation module 218 will then compute that the page 206 where the instruction originates has a trust bit of T=1, and this it is trusted. Based on the access rule that has been defined, the access rule evaluation module 218 will make the determination whether access to a sensitive page will be granted. In some examples, the access rule evaluation module 218 will determine access rights based on defining different access rules that may be based on levels of sensitivity and levels of trust, for example those different rules detailed below with respect to FIG. 4. In some examples the access rule evaluation module 218 may determine that the trust value is a privileged trust value and may determine that access to a sensitive page may be granted irrespective of the sensitivity value or that access to a sensitive page may be determined via an access rule other than the one used with non-privileged trust values.

In this example, the access rule evaluation module 218 would grant access to an instruction originating from the page 206 that is trusted to the page 204 that is sensitive, because it has been identified as trusted. If, for example, an instruction residing on page 210 is attempting to access sensitive page 204, then the access rule evaluation module 218 would deny access for the instruction originating from page 210, because the trust bit of the page address is indicated as T=0, and thus the page 210 is not trusted and, therefore, the rule would result in a value of "false". If, for example, the page 210 that is not trusted includes instructions that are attempting to access (read from or write to) page 212 in the memory module 202, then the access rule evaluation module 218, under the exemplary access control rules, would allow instructions on the page 210 that is not trusted to access the page 212 that is not sensitive.

In some systems, memory may be accessible even if it is physically attached to a different computer device. In such a case, either the memory to which access is requested or the instruction that wants to access a page in the memory module 202 can reside on a page or unit of memory stored on a different computer device or server 222 and connected to the computer device 100 with the current MMU 126. For example, the same modules and steps described above would be used and performed if page 226 included instruction requesting to access page 208. Since page 208 has a S=1 designation as sensitive, the access rule evaluation module will look at the trust level of the page 226 where the instruction originates. Stored in the CPU by the program counter register 132, the page address from where the instruction originates shows a T=1 designation, thus the instruction is trusted and will be granted access to the page 208 that is sensitive. In some examples, the computer device 100, via its operating system and MMU 126 may distinguish between remote computer devices whose trust designations are trusted and those whose trust designations are untrusted. In an example, the MMU may consider all instructions residing on memory attached to untrustworthy computer devices to be untrusted.

In the cases described above where an instruction is permitted access to a page in memory, then an address rewrite module 220 will incorporate the computational result from the access rule evaluation module 218 into the target address, rewriting the address as a reference to a non-existent memory location, for example a reference to a location on a page that is guaranteed to not exist when the access rule evaluation module 218 indicates that access should not be allowed. In an example, each memory address includes a third indicator bit that always contains zero for valid memory, with the system taking care never to allocate a page whose address has a value of one in this indicator bit. Thus, a value of one indicates an illegal address. The address rewrite module 218 may ignore the value of the indicator bit of the requested address and replace it with zero if the access rule evaluation module 218 indicates that access should be allowed and one otherwise. Through the address translation module 128, the MMU 126 performs the final address translation. The translation proceeds based on a check made by the MMU 126. The MMU 126 checks whether the physical page with the rewritten address existed, and is configured to trigger a page fault if not. In the cases where an instruction is not permitted access to a page in memory, then the MMU 126, while performing the check will now see that the physical page with the rewritten address did not exist, and thus a page fault will be triggered, effectively denying the particular instruction access to the particular page.

In some examples, it is possible that there will be more than one MMU in the system. This can be the case if, for example, a cluster scheme is utilized that is sharing an address space. Alternatively, one MMU 126 can be used as described above in controlling access to a number of pages of memory in the system. In some examples, the instruction is just the contents of some word, code, or other contiguous sequence of bytes, on some page in system memory.

Unlike systems that enforce access control by requiring code accessing sensitive data to be running with a special OS privilege level, the check by the MMU 126 is made simply on the basis of the program counter register 132 and the address of the memory being accessed. Thus, there is no overhead experienced for increasing and decreasing a privilege level. Unlike systems that assume that any process on a computer should be allowed to see any data, the current techniques allow for differential access rights, even within the same process. Thus, the ability of one process to safely act on behalf of several principals, for example, users, customers, individuals, and organizations, or to run at different times with elevated or lessened privileges, is greatly simplified.

The block diagram of FIG. 2 is not intended to indicate that the computer device 100 is to include all of the components shown in FIG. 2. Further, any number of additional components may be included within the computer device 200, depending on the details of the specific implementation of the access control techniques described herein.

Figure 3:
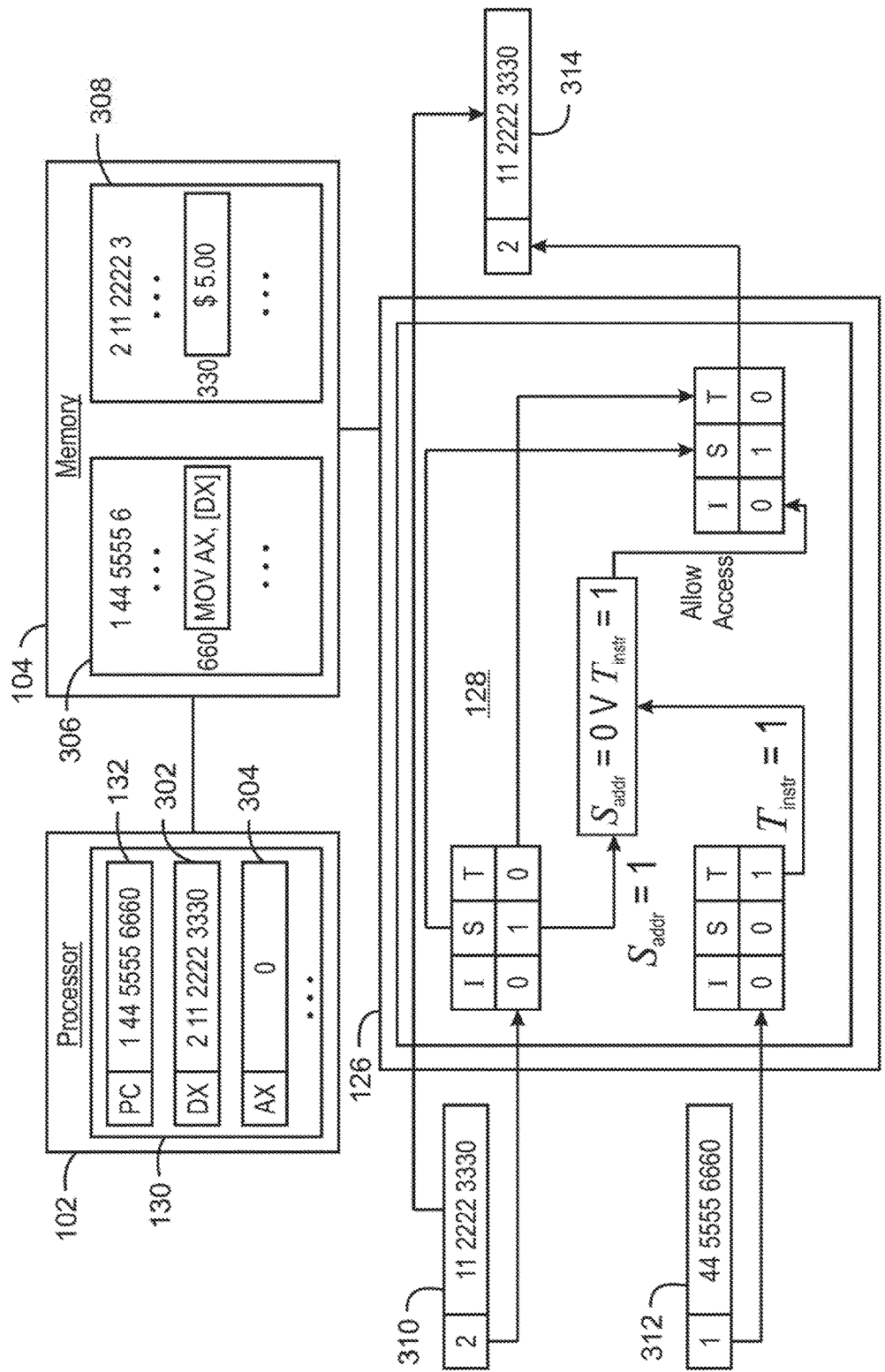
FIG. 3 is a block diagram illustrating an execution of a particular example.

FIG. 3 is a block diagram illustrating an execution of a particular example. Like numbered items are described in the same manner as done previously herein. FIG. 3 depicts a computer system 300 augmented with an MMU 126 according to an example of the present invention. It contains a processor 102 that contains registers 130, among which are a program counter register 132 and two numeric registers, DX 302 and AX 304. The system 300 also contains a memory 104 with two pages of interest, page 14455556, 306, and page 21122223, 308. In an example, addresses are depicted using hexadecimal (base 16) numbers. In an example, addresses are 43 bits wide, including three high-order bits that serve as indicator bits: I indicating an illegal address, S indicating a sensitive address, and T indicating a trusted address. The page size is 4.096 bytes, represented by the low-order twelve bits (three hexadecimal digits) of the address. The page address is, therefore, the high-order 31 bits, including the three indicator bits.

As depicted in FIG. 3, register DX 302 contains 21122223330, which is intended to represent the address of memory location 330 on page 21122223 308. This memory location contains, for example, the balance of a bank account and is, therefore, sensitive data that should only be directly accessible to trusted code. The indicator bits of page 21122223 308 are held in the high-order digit, 2, which in binary is "010", with the second bit equal to one, indicating that the page is, in fact, sensitive.

The program counter register 132 contains 14455556660, which is the address of the instruction currently being executed and which came from memory location 660 on page 14455556 306. This instruction is a "move" (MOV) instruction, instructing the processor 102 to read the contents of the memory location whose address is stored in register DX 302 and put the read value in register AX 304. The indicator bits of page 14455556 306 are held in the high-order digit, 1, which in binary is "001", with the third bit equal to one, indicating that the page is trusted.

When the processor 102 executes this instruction, it requests of the computer system 300 the value held in memory location 21122223330. This results in the address translation module 128 of the MMU 126 being asked to translate the address 21122223330 308 in the context of an instruction at address 14455556660. In alternative examples, there may be an additional step of translating from process-relative virtual addresses to these physical addresses, but in this example it is assumed that no separate virtual address translation takes place.

The MMU 126 of FIG. 3 shows the information flow within the address translation module 128. The indicator bits, "010", are extracted from the target address "21122223330" 310 by the address sensitivity module 214, and the sensitivity indictor bit is examined to determine that the page is sensitive ($S_{addr}=1$). The indicator bits "001" are extracted from the instruction address "14455556660" 312 by the trust determination module 216, and the trust indicator bit is examined to determine that the instruction resides on a trusted page ($T_{instr}=1$). Thus, identifying the sensitivity value and identifying the trust value, in some examples, includes extracting bits from the target address, and extracting bits from the source address, respectively. The access rule evaluation module 218 takes these two determinations and evaluates the Boolean expression $S_{addr}=0 \vee T_{instr}=1$, which yields a "true" value, since $T_{instr}=1$, indicating that the access should be allowed. The address rewrite module 220 then takes this determination along with the requested address and ensures that the illegal address indicator bit is zero, producing the address "21122223330" 314. In this case, this is the same address that was requested, which in this example, is an indication of a legal access.

Had the instruction instead resided, for example, on page "04455556" (not shown), with indicator bits "000", the trust determination module 216 would have determined that the page was untrusted ($T_{instr}=0$), the access rule evaluation module would have determined that the access to the sensitive page by untrusted code should not be allowed, and the address rewrite module 220 would have ensured that the illegal address indicator bit was one, producing the address "61122223330". This address, with an illegal address indicator bit of one, would be guaranteed not to exist in the system, and the MMU 126 would issue a page fault as it tried to read it.

Figure 4:
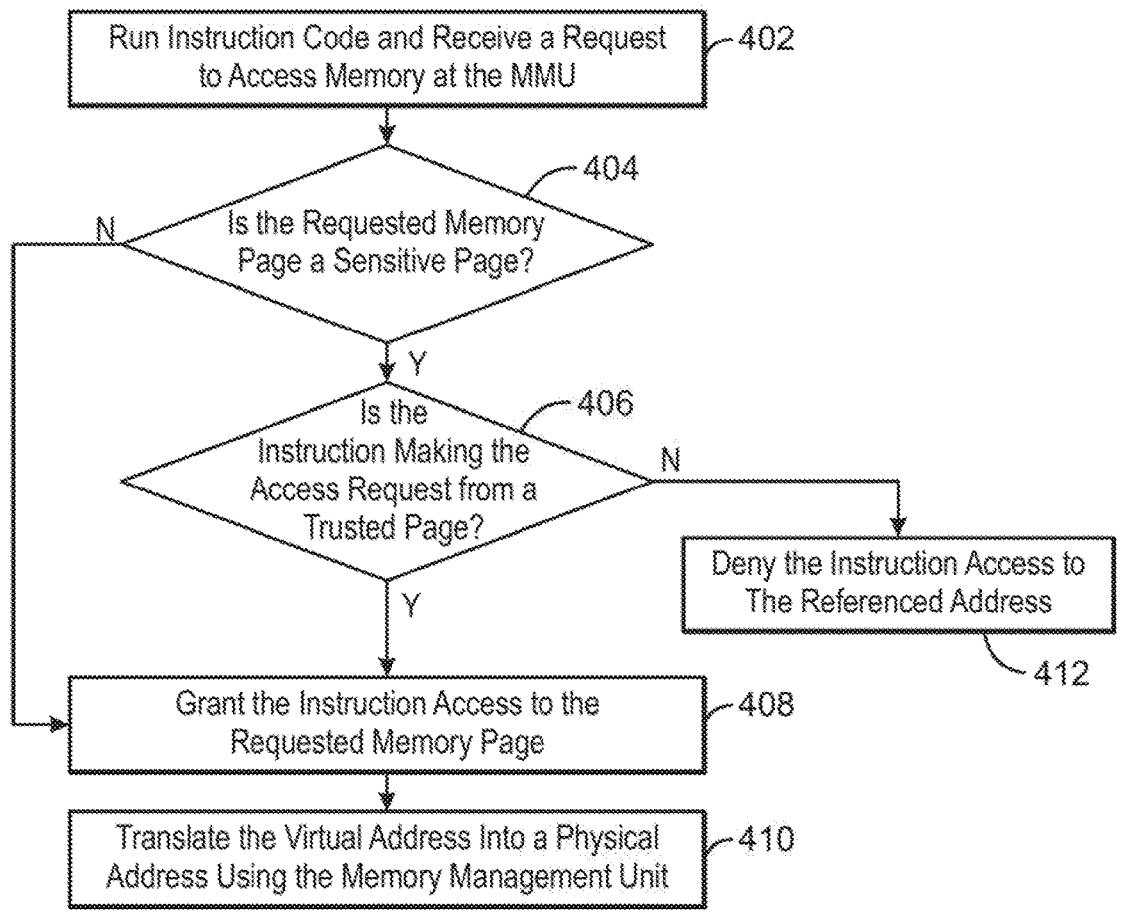
FIG. 4 is a process flow diagram of an example method of performing secure address translation.

FIG. 4 is a process flow diagram of an example method of performing secure address translation. Although execution of method 400 is described below with reference to the MMU 126 of FIG. 1 and FIG. 2, other suitable devices for execution of method 300 may be used. The method 400 may begin at block 402.

At block 402, the MMU receives a request to access memory. The request may be received from a processor such as a CPU or GPU in the course of executing an instruction which was also received from memory.

At block 404 a determination is made regarding whether the page in memory that the instruction is requesting to access is a sensitive page. If the page in memory that is attempting to be accessed by the instruction is a sensitive page, then the process flow continues to block 406.

At block 406, when access to a sensitive page has been requested, a decision is made whether there is an indication that the instruction making the access request originates from a trusted page. This indication can be based upon the address of the instruction, as indicated by the program counter register.

In some examples, an untrusted page will not be able to see or modify the contents of the sensitive page that is returned, and instead this will be done by code on trusted pages. The same holds for asking for trusted pages, although in some examples there can be a system requirement that only trusted code be able to ask for trusted pages. If, at block 406, the program counter related to the instruction requesting access to the sensitive page is indicated by the MMU as originating from a trusted page, then the method 400 continues to block 408.

At block 408, the MMU grants the instruction stored on the trusted page access to the memory on the sensitive page in memory. In examples discussed herein, the sensitivity indication and the trust indication is determined by the address of the page. Both the origin of an instruction and a memory location will have an address, which is a binary number of a certain number of bits, which can be written as a hexadecimal number. The low-order bits may represent the address within the page. The other bits include the page address. Some examples discussed herein use high-order bits to encode S (sensitive), T (trusted), and I (illegal) bits. The half of the address space for which I=0 can be partitioned into four subspaces based on the values of the S and T bits, and each page resides in one of the four subspaces. The half of the address space for which I=1 is explicitly excluded, so if the address translation results in an address that has the I bit set to 1, a page fault will occur because that page does not exist.

At block 410, when the trust level of the page that sends the instruction is verified as trusted and access to the page in memory is granted, the MMU will translate a virtual address into a physical address in memory; and the instruction will be permitted to execute. Method 400 accounts for the program counter when determining whether a page fault should be triggered. This involves the use of address bits from both the program counter and the referenced address to rewrite the referenced address before it is mapped to a physical address. The method 400 described thus distinguishes; via the MMU, between trusted and untrusted code pages within a user process, allowing only trusted code pages to access sensitive data pages. The techniques described herein provide for much faster access to sensitive memory, without having to involve the OS, which will be especially important on future diskless machines with large amounts of non-volatile memory, whose programmers may want to use data in-place.

Returning to block 406, if the MMU determines that the instruction is not from a trusted page, then the process flow advances to block 412. At block 412, the untrusted instruction will be denied access to the referenced address on the sensitive page, and a page fault will be triggered. A processor or the MMU can thus disallow an access upon a determination that the access should not be allowed.

Returning to block 404, if the MMU determines that the page that the processor is attempting to access is not a sensitive page, then the process flow advances directly to block 408, and the instruction will be granted access to the requested memory page, at least in part because the requested memory page is not considered sensitive.

The determinations made at blocks 404 and 406 may be made in either order or they may overlap in time so long as the effect is that control passes to block 412 if block 404 determines that the requested memory page is a sensitive page and block 406 determines that the instruction making the access request is not from a trusted page and that control passes to block 408 otherwise.

The method 400 of FIG. 4 is not intended to indicate that method 400 is to include all of the steps shown in FIG. 4. Further, any number of additional steps may be included within the method 400, including, for example, permitting a process to use a single global address space to refer to data, or permitting differential access rights to a page in memory within the same process, while still enabling the access control functionality described.

Figure 5:
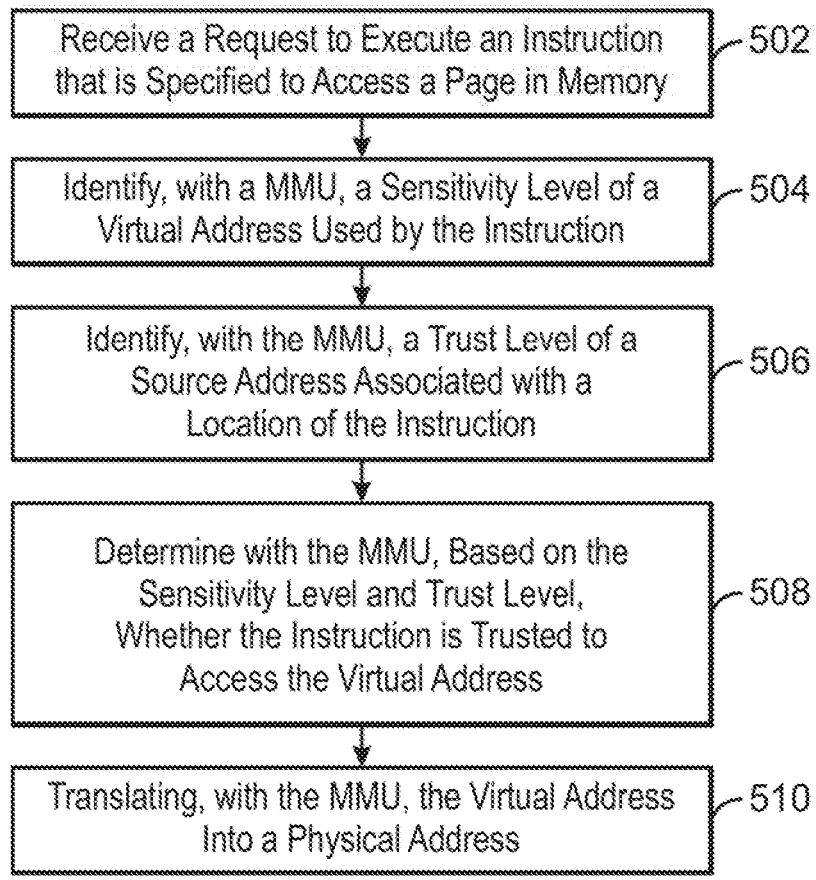
FIG. 5 is a process flow diagram summarizing a method of performing secure address translation.

FIG. 5 is a process flow diagram summarizing a method of performing secure address translation. Although execution of method 500 is described below with reference to the MMU 126 of FIG. 1 and FIG. 2, other suitable devices for execution of method 500 may be used. Method 500 may be implemented in the form of executable instructions stored on a machine-readable storage medium, such as a computer readable medium, or in the form of electronic circuitry.

Method 500 may start at block 502 when a request to execute an instruction that is specified to access a page in memory is received. The method 500 continues to block 504, where the MMU, separately or in conjunction with a processor, identifies a sensitivity level of a virtual address used by the instruction specified to access a page in memory. In some examples, it can be assumed that each page address has two bits, S (sensitive) and T (trusted). In this example, memory on sensitive pages (those with S=1) are only allowed to be accessed (read or written) from instructions stored on trusted pages (those with T=1). This allows a particular address space to contain a mixture of trusted and untrusted code and sensitive and non-sensitive data, and code.

At block 506, the MMU identifies a trust level of a source address associated with a location of the instruction. When a request is made to load code, for example, for a library, into a trusted page, the system uses trusted code and validates that the code is, in fact, trustworthy. For example, the OS may be able to obtain and verify a certificate that attests to the source, integrity, or trustworthiness of the code based on a hash of its contents. If the page being loaded into is both trusted and non-sensitive (T=1, S=0), it should be required to be read-only, to prevent untrusted code from making modifications after being loaded. The identification of the trust address at block 506 may be performed concurrently with the identification of the sensitivity level at block 504.

At block 508, the MMU determines, based on the sensitivity level and trust level identified, whether the request to execute the instruction is trusted to access the virtual address. In some examples, when a memory reference occurs, the MMU checks to make sure that if the referenced address is on a sensitive page (S[a]=1), the instruction referencing it is on a trusted page (T[pc]=1), and triggers a page fault otherwise. Another way to achieve this technique is for addresses to have a further bit, I (illegal), that is always zero for a real address, and to have the MMU rewrite this bit as $I[a] \leftarrow S[a]=1 \vee T[pc]=0$. This bit will be equal to one, and, therefore, reference a non-existent page, resulting in a page fault when used, only when the address is sensitive and the page is entrusted. The illegal bit can be set to the complement of the result of evaluating the access rule described with respect to FIG. 2. That is, the expression $I[a] \leftarrow S[a]=1 \vee T[pc]=0$ has the same effect as allowing access when the rule $S[a]=0 \vee T[pc]=1$ evaluates to "true".

This exemplary technique can be generalized to multiple levels of trust by allocating k bits for each of S and T, interpreted as a number, thereby having the sensitivity value and trust values be numeric indications of a sensitivity level and trust level respectively, and raising a page fault based on comparing the sensitivity level to the trust level, for example when S[a]>T[pc], for example, by setting $I[a] \leftarrow S[a] \geq T[pc]$. Thus, the allowability of the memory access request can be determined based on comparing the sensitivity value to the trust value. In some examples, lower numbers may be used to indicate more trusted pages and the trust level must therefore be at no greater than the sensitivity level. In some examples the trust level must be strictly greater than the sensitivity level or strictly less than the sensitivity level. In some examples, other computations involving the sensitivity level and trust level may be performed in making the determination. In some such examples, trusted pages can be verified as trustworthy by code running on more trusted pages, for example, by code running on pages at least as trusted. For example, a page at trust level 5 may be allocated and populated by code from a page at trust level 7 but not by code from a page at trust level 2. In some example, trusted pages may be allocated and populated only by code running on sufficiently trusted pages, for example when T[pc]>θ for some threshold, θ. Similar to the two-level scheme described earlier, in some examples with multiple levels, the system may require that when pages are allocated, the sensitivity level of the allocated page be at least as high as its trust level, to ensure that less-trusted code cannot place code on more-trusted pages and execute it with higher trust levels.

In some examples, the k bits can be used to encode, as a number or other identifier, a subsystem identifier, with the sensitivity value being a sensitivity subsystem identifier and the trust value being a trust subsystem identifier, where the check is that when the sensitivity subsystem identifier of the referenced page is not zero, indicating that access should only be permitted to that code trusted by a particular programmatic subsystem, the sensitivity subsystem identifier is compared to the trust subsystem identifier and a determination is made that the trust subsystem of the instructions page has a matching number, that is, $I[a] \leftarrow S[a] \neq 0 \wedge S[a] \neq T[pc]$. Examples of a programmatic subsystem may include an operating system, a virtual machine, a database system, a web server, a customer or patient record system, a file system, an I/O subsystem, a task scheduler, and a system for controlling devices or mechanisms outside the computer system, for example. In this way, a database might be allocated by the operating system, subsystem identifier 3, while a building alarm control system might be allocated subsystem identifier 5. Each would have its own set of sensitive and trusted pages, and each system's trusted pages would be able to read and modify the contents of its own sensitive pages but not the contents of sensitive pages associated with the other subsystem. In some such examples, one or more subsystems may be designated as "privileged" and trusted pages of these subsystems may be allowed access to sensitive pages of some or all other subsystems. For example, the operating system itself may be designated as subsystem 1, a subsystem indicator of zero being used to represent "no specific subsystem," and allowed access to all pages, regardless of sensitivity level. This is equivalent to a rewrite rule of $I[a] \leftarrow S[a] \neq 0 \wedge T[pc] \neq 1 \wedge S[a] \neq T[pc]$. In some examples, pages whose trust subsystem identifier may only be allocated by code on pages with the same trust subsystem identifier, by pages with trust subsystem identifiers identified to the operating system as being trusted by that subsystem, or by pages with a privileged trust subsystem identifier such as one representing the operating system. In some examples there is only a single identified subsystem, which may be identified with the operating system, and therefore k=1 and there is only a single bit identifying it. In such examples, the sensitivity subsystem identifier and trust subsystem identifier are equivalent to the single-bit sensitivity indicator and trust indicator respectively. In some examples, the sensitivity and trust indicators may indicated that a page is trusted by all of a plurality of subsystems or that its sensitivity is such that it can be read only by pages trusted by any of a plurality of subsystems.

Combinations of the foregoing trust and sensitivity indications could be used. For example, there might be a single trust bit T, k subsystem bits for sensitivity S and trust Y, and $I[a] \leftarrow S[a] \neq 0 \wedge T[pc]=0 \wedge S[a] \neq Y[pc]$. That is, if the referenced page is associated with a subsystem (S[a]≠0), a problem will be flagged unless the referencing page is either trusted (T[pc]=1) or associated with the same subsystem (S[a]=Y[pc]).

The techniques described by method 500 provide that when a thread tries to read from or write to an address in its address space, while in the process of mapping the address to a physical address, the MMU performs a check to determine whether access should be allowed. Rather than monitoring the privilege level of the running thread, the MMU bases the access decision on the address in the program counter. As long as the correct virtual address is found when the address is being rewritten, and if the instruction originates from a trusted page, then the MMU can map the virtual address to the physical address. Thus, at block 510, the MMU is configured to translate the virtual address into a physical address, and the instruction can be permitted to execute.

In some examples, there may be separate sensitivity indicators to indicate the sensitivity of the data on the pages to different memory operations, for example reading, writing, and executing, for example, transferring control to code on the page. In this way, the operating system or a program or subsystem can have data that any process can read but only trusted processes can modify or routines that anybody can call but untrusted code cannot read and thereby disassemble. In some examples there may also be separate trust indicators to indicate the trust of the code on the pages to perform different operations on sensitive data. In this way, some code could be trusted to read sensitive data or sensitive subsystem data from a particular subsystem but not to modify that data.

In some examples, notably those that do not have separate sensitivity indicators for "read" and "execute" operations, it may be desirable to allow untrusted code to call trusted code but not to examine the trusted code itself to discover how it is implemented. This may be achieved by loading a dispatch table into a trusted, non-sensitive, preferably read-only page and the actual implementation into trusted, sensitive pages, where the dispatch table contains instructions to jump to the actual implementation code. The untrusted code can use a local function call to transfer control to an entry in the dispatch table, since it is on a non-sensitive page, but then control is immediately transferred to the actual implementation. The untrusted code can see the address of the actual implementation, but it cannot read the implementation, since it is on a sensitive page. The dispatch table code, however, being trusted, can call the implementation.

In another example of the present techniques, for the case with single S and T bits, is to have the MMU keep two tables mapping the virtual address to the physical address. One table can be used when T[pc]=0, and the other table can be used when T[pc]=1. When T[pc]=1, the normal lookup takes place, and when T[pc]=0, the MMU is configured to raise a page fault when S[a]=1, and does the normal lookup otherwise. Thus, the MMU can make an allowability determination for the memory access request based on looking up a value in a table based on the source address and the target address.

In another example, the MMU can maintain a side table P of pairs of pages (a, pc) or triples of pages and operations (a, pc, op) that have been determined to be acceptable. Then the requested address a would initially be rewritten using I[a]←S[a]=1∧¬P[a, pc]. If this results in a page fault, a handler module of the MMU can be configured to trap to code that attempted to determine whether the reference should be allowed. If so, the MMU would set P[a, pc]←1 and retry the lookup, otherwise it would propagate the page fault, thereby denying access to the referenced memory. Alternatively, the trap to the handler can be enabled only when the table does not contain an entry for the pair or triple and the result, whether positive or negative, can be stored in the table. This can be accomplished by having multiple I bits and setting them to different values based on whether the table indicates that the access should or should not be allowed or whether it does not have any indication.

In the foregoing, the description of sensitivity "indicators", "bits", or "levels" for a page (or other unit of memory), or the identification of the sensitivity of a page with one or more subsystems, either in general or with respect to certain types of memory access requests, also known as "operations," can be considered to be examples of a more general notion of a "sensitivity value" associated with the memory location or page. A memory access request can be a read or a write action, can be a call or jump, for example. Similarly, the description of trust "indicators", "bits", or "levels" for a page (or other unit of memory), or the identification of the trust level of a page with one or more subsystems, either in general or with respect to certain types of memory access requests, can be considered to be examples of a more general notion of a "trust value" associated with the memory location or page.

The method 500 of FIG. 5 is not intended to indicate that method 500 is to include all of the steps shown in FIG. 5. Further, any number of additional steps may be included within the method 500, including, for example, permitting a process to use a single global address space to refer to data, or permitting differential access rights to a page in memory within the same process while still enabling the access control functionality described.

Figure 6:
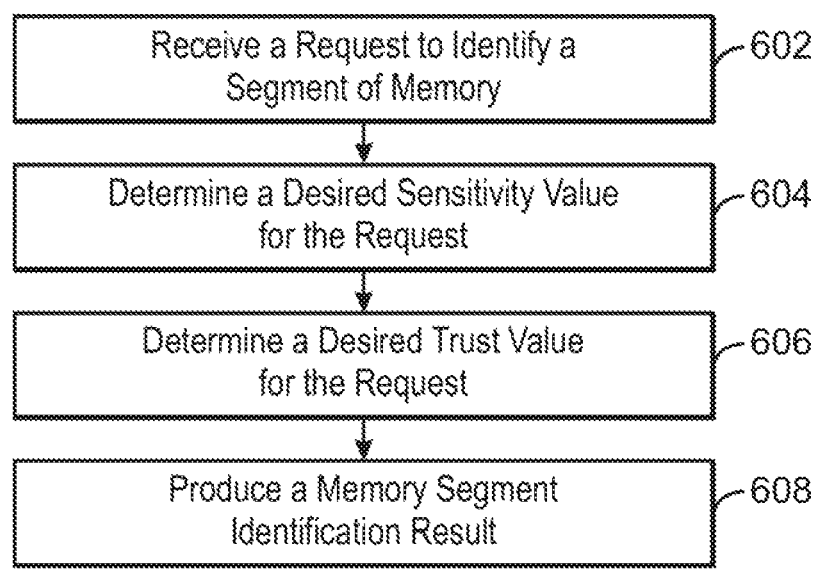
FIG. 6 is a process flow diagram summarizing a method of identifying a segment of memory to determine access rights.

FIG. 6 is a process flow diagram summarizing a method of identifying a segment of memory to determine access rights. Although execution of the method 600 is described below with reference to a processor on a computer device and in response to a request to identify a segment of memory, other suitable devices for execution of the method 600 may be used. The method 600 may be implemented in the form of executable instructions stored on a non-transitory machine-readable storage medium, such as a computer readable medium, or in the form of electronic circuitry, or on a computer device comprising logic. The method 600 may begin at block 602.

At block 602, a request to identify a memory segment can be received. The request can be, for example, associated with a request to allocate memory. The request can be, for example, associated with a request to load a resource into memory. The request can also be, for example, a request to identify a segment of memory including a plurality of sub-segments. A sufficiently identified process can be permitted to use a single global address space to refer to data, or be permitted differential access rights to a page in memory within the same process while enabling the access control functionality described herein.

At block 604, a desired sensitivity value is determined for the request to identify the memory segment. Determining the desired sensitivity value can be, for example, based on data associated with a resource loaded or to be loaded into memory. The desired sensitivity value can be determined, for example, based on information associated with the request such as the memory address or range of memory addresses to be accessed by the request or a parameter identifying the desired sensitivity level. In some examples, determining the desired sensitivity value can include determining a plurality of sensitivity values.

At block 606, a desired trust value for the request is determined. Determining the desired trust value can be, for example, based on data associated with a resource loaded or to be loaded into memory. The desired trust value can be determined, for example, based on a plurality of desired trust values. In some examples, determining the desired trust value can be based on information associated with the request.

At block 608, a memory segment identification result is produced based on the desired sensitivity value and trust value. Producing the memory segment identification result can include, for example, identifying a previously-allocated memory page. The previously-allocated memory page can have an associated sensitivity value and trust value. The memory segment identification result can also be produced, for example, by allocating a memory page. The allocated memory page can have an associated sensitivity value and trust value. The associated sensitivity value and trust value can be compatible with the desired sensitivity and desired trust value. Producing the identification result can also include, for example, identifying a plurality of memory sub-segments based on a plurality of desired sensitivity values and desired trust values. In some examples, producing the memory segment identification result may include checking a constraint based on the desired sensitivity and trust value. Checking the constraint can be based, for example, on a trust value associated with a memory location containing an instruction associated with issuing the request. Checking the constraint can be based, for example, on a credential associated with a computational context associated with the request. When the constraint is not satisfied, a memory segment identification result can be produced that includes an indication of a refusal to identify, altering at least one of the desired sensitivity value and the desired trust value.

The method 600 of FIG. 6 is not intended to indicate that method 600 is to include all of the steps shown in FIG. 6. Further, any number of additional steps may be included within the method 600.

The foregoing disclosure describes a number of examples for securely translating a virtual address into a physical address. Some examples translate, upon use of a virtual address by an instruction, the virtual address into a physical address. In some examples, the translating can include establishing a sensitivity level of the virtual address, and establishing a trust level of a source address associated with a location of the instruction. In some examples, the translating can include making a determination, based on the sensitivity level and the trust level established, whether the instruction is trusted to access the virtual address. In some examples, the translating can include taking an action in response to the determination of whether the instruction is trusted to access the virtual address.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method performed on a computer device in response to a request to identify a segment of memory, comprising:
   determining a desired sensitivity value for the request, wherein the request to identify the segment of memory is associated with a request to allocate memory;
   determining a desired trust value for the request; and
   producing a memory segment identification result based on the desired sensitivity value and based on the desired trust value at least in part by identifying a previously allocated memory page that has an associated sensitivity value and an associated trust value that are compatible with the desired sensitivity value and the desired trust value.

2. The method of claim 1, wherein determining at least one of the desired sensitivity value and the desired trust value is based on information associated with the request.

3. The method of claim 1, wherein:
   the request to identify a segment of memory is associated with a request to load a resource into memory; and
   determining at least one of the desired sensitivity value and desired trust value is based on data associated with the resource.

4. The method of claim 1, wherein producing the memory segment identification result comprises:
   checking a constraint based on the desired sensitivity value and the desired trust value; and
   when the constraint is not satisfied, at least one of producing a memory segment identification result comprising an indication of a refusal to identify and altering at least one of the desired sensitivity value and the desired trust value.

5. The method of claim 4, wherein checking the constraint is further based on a trust value associated with a memory location containing an instruction associated with issuing the request.

6. The method of claim 4, wherein checking the constraint is further based on a credential associated with a computational context associated with the request.

7. A computer system comprising:
   a processor;
   a memory device; and
   logic to:
      receive a request to identify a memory segment of the memory device;
      determine a desired sensitivity value for the request, wherein the request to identify the memory segment is associated with a request to allocate memory;
      determine a desired trust value for the request; and
      identify the memory segment based on the desired sensitivity value and the desired trust value at least in part by identifying a previously allocated memory page that has an associated sensitivity value and an associated trust value that are compatible with the desired sensitivity value and the desired trust value.

8. The computer system of claim 7, further comprising a programmatic subsystem associated with the request, wherein at least one of the desired sensitivity value and the desired trust value is determined based on the programmatic subsystem, the computer system further comprising logic to determine that an instruction in the memory device, when executed on the processor, should not be allowed to access a memory location in the memory segment.

9. A non-transitory, computer-readable medium containing instructions which when read into a memory of a computer system and executed will cause the computer system to respond to a request to identify a segment of memory by:
   determining a desired sensitivity value for the request;
   determining a desired trust value for the request; and
   identifying the segment of memory based on the sensitivity value and the trust value at least in part by identifying a previously allocated memory page that has an associated sensitivity value and an associated trust value that are compatible with the desired sensitivity value and the desired trust value.

10. The computer-readable medium of claim 9, wherein the request to identify the segment of memory is associated with one of a request to allocate memory and a request to load a resource.

11. The computer-readable medium of claim 9, wherein identifying the memory segment comprises checking a constraint based on the desired sensitivity value and the desired trust value.

12. The computer-readable medium of claim 9, wherein determining at least one of the desired sensitivity value and the desired trust value is based on a programmatic subsystem associated with the request.

13. A method performed on a computer device in response to a request to identify a segment of memory, comprising:
    determining a desired sensitivity value for the request, wherein the request to identify the segment of memory is associated with a request to allocate memory;
    determining a desired trust value for the request; and
    producing a memory segment identification result based on the desired sensitivity value and based on the desired trust value at least in part by allocating a memory page that has an associated sensitivity value and an associated trust value that are compatible with the desired sensitivity value and the desired trust value.

14. A computer system comprising:
    a processor;
    a memory device; and
    logic to:
        receive a request to identify a memory segment of the memory device;
        determine a desired sensitivity value for the request, wherein the request to identify the memory segment is associated with a request to allocate memory;
        determine a desired trust value for the request; and
    identify the memory segment based on the desired sensitivity value and the desired trust value at least in part by allocating memory page that has an associated sensitivity value and an associated trust value that are compatible with the desired sensitivity value and the desired trust value.

15. A non-transitory, computer-readable medium containing instructions which when read into a memory of a computer system and executed will cause the computer system to respond to a request to identify a segment of memory by:
    determining a desired sensitivity value for the request;
    determining a desired trust value for the request; and
    identifying the segment of memory based on the sensitivity value and the trust value at least in part by allocating a memory page that has an associated sensitivity value and an associated trust value that are compatible with the desired sensitivity value and the desired trust value.

16. A method performed on a computer device in response to a request to identify a segment of memory comprising a plurality of memory sub-segments, the method comprising:
    determining a desired sensitivity value for the request at least in part by determining a plurality of desired sensitivity values;
    determining a desired trust value for the request at least in part by determining a plurality of desired trust values; and
    producing a memory segment identification result based on the desired sensitivity value and based on the desired trust value at least in part by identifying the plurality of memory sub-segments based on the plurality of desired sensitivity values and based on the plurality of desired trust values.

17. A computer system comprising:
    a processor;
    a memory device; and
    logic to:
        receive a request to identify a memory segment comprising a plurality of memory sub-segments of the memory device;
        determine a desired sensitivity value for the request at least in part by determining a plurality of desired sensitivity values;
        determine a desired trust value for the request at least in part by determining a plurality of desired trust values; and
        identify the memory segment based on the desired sensitivity value and the desired trust value at least in part by identifying the plurality of memory sub-segments based on the plurality of desired sensitivity values and based on the plurality of desired trust values.

* * * * *